US010652031B2

(12) United States Patent
Kravitz et al.

(10) Patent No.: US 10,652,031 B2
(45) Date of Patent: May 12, 2020

(54) USING PKI FOR SECURITY AND AUTHENTICATION OF CONTROL DEVICES AND THEIR DATA

(71) Applicant: T-CENTRAL, INC., Dover, DE (US)

(72) Inventors: David W. Kravitz, San Jose, CA (US); Donald Houston Graham, III, Pasadena, CA (US); Josselyn L. Boudett, Clearwater, FL (US); Russell S. Dietz, San Ramon, CA (US); Kent William Stacy, Reno, NV (US)

(73) Assignee: T-CENTRAL, INC., Dover, DE (US)

( * ) Notice: Subject to any disclaimer, the term of this patent is extended or adjusted under 35 U.S.C. 154(b) by 0 days.

(21) Appl. No.: 16/236,124

(22) Filed: Dec. 28, 2018

(65) Prior Publication Data

US 2019/0140849 A1 May 9, 2019

Related U.S. Application Data

(60) Continuation-in-part of application No. 15/890,140, filed on Feb. 6, 2018, now Pat. No. 10,333,720, which
(Continued)

(51) Int. Cl.
*H04L 9/32* (2006.01)
*H04L 29/06* (2006.01)
(Continued)

(52) U.S. Cl.
CPC ............ *H04L 9/3268* (2013.01); *H04L 9/006* (2013.01); *H04L 9/0819* (2013.01);
(Continued)

(58) Field of Classification Search
CPC ... H04L 9/3268; H04L 9/006; H04L 9/93255; H04L 63/0876; H04L 63/10; H04L 9/3255
(Continued)

(56) References Cited

U.S. PATENT DOCUMENTS 7,085,365 B2 * 8/2006 Kauppinen ............. H04W 4/08
379/202.01
7,263,611 B2 * 8/2007 Itkis ...................... H04L 9/0833
380/278
(Continued)

FOREIGN PATENT DOCUMENTS

CN 105791272 A 7/2016

OTHER PUBLICATIONS

International Search Report ,Transmittal, and Recordation of Search History (12 pages) and Written Opinion (6 pages) for related International Patent Application No. PCT/US17/24112 filed Mar. 24, 2017.
(Continued)

*Primary Examiner* — Saleh Najjar
*Assistant Examiner* — Peiliang Pan
(74) *Attorney, Agent, or Firm* — Lewis Roca Rothgerber Christie LLP

(57) ABSTRACT

Method for authenticating a first and a second electronic devices associated through a communication line includes: creating a unique ID, by a third electronic device; transmitting the unique ID to the first electronic device; signing the transmitted unique ID by the first electronic device; transmitting the signed unique ID to the second electronic device, by the first electronic device; signing the transmitted signed unique ID by the second electronic device; transmitting the unique ID signed by the first and second electronic devices to the third electronic device; verifying and accepting the unique ID signed by the first device and the second device, by the third device; issuing a certificate for a secure communication line between the first electronic device and the second electronic device; and transmitting the certificate to the first electronic device and the second electronic device.

15 Claims, 11 Drawing Sheets

Related U.S. Application Data is a division of application No. 15/686,076, filed on Aug. 24, 2017, now Pat. No. 10,153,908, which is a continuation-in-part of application No. 15/621,982, filed on Jun. 13, 2017, now Pat. No. 9,832,026, which is a continuation of application No. 15/469,244, filed on Mar. 24, 2017, now Pat. No. 9,716,595, which is a continuation-in-part of application No. 15/269,832, filed on Sep. 19, 2016, now abandoned, which is a continuation of application No. 15/002,225, filed on Jan. 20, 2016, now Pat. No. 9,455,978, which is a continuation of application No. 14/218,897, filed on Mar. 18, 2014, now Pat. No. 9,270,663, and a continuation-in-part of application No. 13/481,553, filed on May 25, 2012, now abandoned, and a continuation-in-part of application No. 13/096,764, filed on Apr. 28, 2011, now abandoned, said application No. 15/469,244 is a continuation-in-part of application No. 15/409,427, filed on Jan. 18, 2017, now abandoned, which is a continuation of application No. 15/154,861, filed on May 13, 2016, now Pat. No. 9,578,035, which is a continuation of application No. 14/715,588, filed on May 18, 2015, now Pat. No. 9,356,916, which is a continuation-in-part of application No. 14/218,897, filed on Mar. 18, 2014, now Pat. No. 9,270,663, said application No. 15/154,861 is a continuation-in-part of application No. 13/481,553, filed on May 25, 2012, now abandoned, and a continuation-in-part of application No. 13/096,764, filed on Apr. 28, 2011, now abandoned.

(60) Provisional application No. 62/611,527, filed on Dec. 28, 2017, provisional application No. 62/644,470, filed on Mar. 17, 2018, provisional application No. 62/648,945, filed on Mar. 28, 2018, provisional application No. 62/718,724, filed on Aug. 14, 2018, provisional application No. 62/741,409, filed on Oct. 4, 2018, provisional application No. 62/777,104, filed on Dec. 8, 2018, provisional application No. 62/536,884, filed on Jul. 25, 2017, provisional application No. 62/313,124, filed on Mar. 25, 2016, provisional application No. 62/326,812, filed on Apr. 24, 2016, provisional application No. 62/330,839, filed on May 2, 2016, provisional application No. 62/347,822, filed on Jun. 9, 2016, provisional application No. 62/369,722, filed on Aug. 1, 2016, provisional application No. 62/373,769, filed on Aug. 11, 2016, provisional application No. 62/401,150, filed on Sep. 28, 2016, provisional application No. 61/792,927, filed on Mar. 15, 2013, provisional application No. 61/650,866, filed on May 23, 2012, provisional application No. 61/490,952, filed on May 27, 2011, provisional application No. 61/416,629, filed on Nov. 23, 2010, provisional application No. 61/367,576, filed on Jul. 26, 2010, provisional application No. 61/367,574, filed on Jul. 26, 2010, provisional application No. 61/330,226, filed on Apr. 30, 2010, provisional application No. 62/133,371, filed on Mar. 15, 2015, provisional application No. 61/994,885, filed on May 17, 2014.

(51) Int. Cl.
| | | |
|---|---|---|
| *H04L 9/08* | (2006.01) | |
| *H04W 12/08* | (2009.01) | |
| *H04W 12/06* | (2009.01) | |
| *H04L 9/00* | (2006.01) | |

(52) U.S. Cl.
CPC .......... *H04L 9/3236* (2013.01); *H04L 9/3255* (2013.01); *H04L 63/0823* (2013.01); *H04L 63/0876* (2013.01); *H04L 63/10* (2013.01); *H04L 63/102* (2013.01); *H04W 12/06* (2013.01); *H04W 12/08* (2013.01); *H04L 2209/38* (2013.01); *H04L 2209/84* (2013.01)

(58) Field of Classification Search
USPC ........................................................ 713/156
See application file for complete search history.

(56) References Cited

U.S. PATENT DOCUMENTS

| | | | |
|---|---|---|---|
| 8,520,695 B1 | 8/2013 | Rubin et al. | |
| 8,656,484 B2 | 2/2014 | Barton et al. | |
| 9,094,407 B1 | 7/2015 | Matthieu et al. | |
| 9,900,305 B2* | 2/2018 | Levergood | G06Q 20/10 |
| 2003/0063735 A1 | 4/2003 | Brockenbrough et al. | |
| 2005/0232406 A1* | 10/2005 | Kauppinen | H04W 4/08 |
| | | | 379/202.01 |
| 2007/0050618 A1 | 3/2007 | Roux et al. | |
| 2007/0104180 A1* | 5/2007 | Aizu | H04L 29/06 |
| | | | 370/352 |
| 2010/0262308 A1 | 10/2010 | Anderson et al. | |
| 2012/0311686 A1* | 12/2012 | Medina | H04L 63/0807 |
| | | | 726/7 |
| 2013/0244614 A1* | 9/2013 | Santamaria | H04L 51/04 |
| | | | 455/411 |
| 2014/0241354 A1 | 8/2014 | Shuman et al. | |
| 2015/0052066 A1* | 2/2015 | Vincent | G06Q 20/38215 |
| | | | 705/76 |
| 2015/0222621 A1 | 8/2015 | Baum et al. | |
| 2015/0334554 A1 | 11/2015 | Song et al. | |
| 2016/0087933 A1 | 3/2016 | Johnson et al. | |
| 2016/0253651 A1* | 9/2016 | Park | G07F 9/023 |
| | | | 705/39 |
| 2018/0091489 A1* | 3/2018 | Biggs | H04L 9/0833 |
| 2018/0294956 A1* | 10/2018 | O'Brien | H04L 9/0637 |
| 2018/0323977 A1* | 11/2018 | Hojsik | H04L 9/3268 |
| 2019/0005470 A1* | 1/2019 | Uhr | H04L 9/3265 |

OTHER PUBLICATIONS

Extended European Search Report dated Oct. 18, 2019 for corresponding European patent application No. 17771273.4 (9 pages).

\* cited by examiner

USING PKI FOR SECURITY AND AUTHENTICATION OF CONTROL DEVICES AND THEIR DATA

CROSS-REFERENCE TO RELATED APPLICATIONS

This patent application claims the benefits of U.S. Provisional Patent Application Ser. Nos. 62/611,527, filed on Dec. 28, 2017; 62/644,470, filed on Mar. 17, 2018; 62/648,945, filed on Mar. 28, 2018; 62/718,724, filed on Aug. 14, 2018; 62/741,409, filed on Oct. 4, 2018; and 62/777,104 filed on Dec. 8, 2018; the entire contents of which are hereby expressly incorporated by reference.

This patent application is also a continuation-in-part of U.S. patent application Ser. No. 15/890,140 filed on Feb. 6, 2018, which is a divisional of U.S. patent application Ser. No. 15/686,076 filed on Aug. 24, 2017, which is a continuation-in-part of U.S. patent application Ser. No. 15/621,982 filed on Jun. 13, 2017 and claims the benefit and the priority to U.S. Provisional Patent Application No. 62/536,884 filed on Jul. 25, 2017.

Said U.S. patent application Ser. No. 15/621,982 is a continuation of U.S. patent application Ser. No. 15/469,244 filed Mar. 24, 2017 (now issued as U.S. Pat. No. 9,716,595), which claims the benefit of U.S. Provisional Patent Application Nos. 62/313,124 filed Mar. 25, 2016; 62/326,812 filed Apr. 24, 2016; 62/330,839 filed May 2, 2016; 62/347,822 filed Jun. 9, 2016; 62/369,722 filed Aug. 1, 2016; 62/373,769 filed Aug. 11, 2016; and 62/401,150 filed Sep. 28, 2016; and is a continuation-in-part of U.S. patent application Ser. No. 15/269,832 filed Sep. 19, 2016; and said U.S. patent application Ser. No. 15/269,832 is a continuation of U.S. patent application Ser. No. 15/002,225 filed Jan. 20, 2016 (now issued as U.S. Pat. No. 9,455,978) and said U.S. patent application Ser. No. 15/002,225 is a continuation of U.S. patent application Ser. No. 14/218,897 filed Mar. 18, 2014 (now issued as U.S. Pat. No. 9,270,663) and said U.S. patent application Ser. No. 14/218,897 claims the benefit of U.S. Provisional Patent Application No. 61/792,927 filed Mar. 15, 2013. U.S. patent application Ser. No. 15/002,225 is also a continuation-in-part of U.S. patent application Ser. No. 13/481,553 filed May 25, 2012, which claims the benefit of U.S. Provisional Patent Application Nos. 61/650,866 filed May 23, 2012 and 61/490,952 filed May 27, 2011.

Said U.S. patent application Ser. No. 15/002,225 is also a continuation-in-part of U.S. patent application Ser. No. 13/096,764 filed Apr. 28, 2011, which claims the benefit of U.S. Provisional Patent Application Nos. 61/416,629 filed Nov. 23, 2010; 61/367,576 filed Jul. 26, 2010; 61/367,574 filed Jul. 26, 2010; and 61/330,226 filed Apr. 30, 2010.

Said U.S. patent application Ser. No. 15/469,244 is a continuation-in-part of U.S. patent application Ser. No. 15/409,427 filed Jan. 18, 2017, which is a continuation of U.S. patent application Ser. No. 15/154,861 filed May 13, 2016 (now issued as U.S. Pat. No. 9,578,035), and said U.S. patent application Ser. No. 15/154,861 is a continuation of U.S. patent application Ser. No. 14/715,588 filed May 18, 2015 (now issued as U.S. Pat. No. 9,356,916), which claims the benefit of U.S. Provisional Patent Application Nos. 62/133,371, filed Mar. 15, 2015; 61/994,885 filed May 17, 2014; and 61/367,576 filed Jul. 26, 2010. Said U.S. patent application Ser. No. 14/715,588 is also a continuation-in-part of Ser. No. 14/218,897 filed Mar. 18, 2014 (now issued as U.S. Pat. No. 9,270,663), which claims the benefit of 61/792,927 filed Mar. 15, 2013. Said U.S. patent application Ser. No. 15/154,861 filed May 13, 2016 is a continuation-in-part of U.S. patent application Ser. No. 13/481,553 filed May 25, 2012, which claims the benefit of U.S. Provisional Patent Application Nos. 61/650,866 filed May 23, 2012 and 61/490,952 filed May 27, 2011.

Said U.S. patent application Ser. No. 15/154,861 filed May 13, 2016 is a continuation-in-part of U.S. patent application Ser. No. 13/096,764 filed Apr. 28, 2011, which claims the benefit of U.S. Provisional Patent Application Nos. 61/416,629 filed Nov. 23, 2010; 61/367,574 filed Jul. 26, 2010; and 61/330,226 filed Apr. 30, 2010. The entire contents of all of the above-identified applications are hereby expressly incorporated herein by reference.

FIELD OF THE INVENTION

The disclosed invention generally relates to security and authentication of electronic devices and their data, and more specifically using Public Key Infrastructure (PKI) for security and authentication of electronic devices and their data.

BACKGROUND

As security technology has evolved in recent years to support Internet of Things (IoT) devices. These devices may be served by having a device root of trust, preferably with integrated capabilities to support cryptography and related actions.

Generally security, management and other challenges are preferably addressed when creating products and solutions whose components include IoT devices. Protecting, controlling and managing IoT devices can be challenging and fraught with danger, risk and potential liability. Manufactured products that incorporate IoT devices within them, generally increase product risks and management challenges by such component IoT devices.

Manufactured products (e.g., an automobile, medical device, etc.) along with their component IoT devices, typically should do many things. For one, products should ensure control over the data that is produced. This may include the protection of data as well as its transmission and communication.

Traditional computer security typically relies on firewalls that generally create a protective wall around a computer, electronic device, groups of each as well as others. Traditional reliance on perimeter defense is generally inadequate or insufficient when it comes to IoT devices as IoT frequently are expected to perform in areas beyond typical network protection as well as sometime in an area of weal or non-existent network protection. In our modern digital world, as intelligent things (e.g., IoT devices) begin to proliferate, a shift from general "stand-alone intelligent things" to a more expected "collaborative intelligent things" model should require an enhanced approach to security. In the collaborative model, multiple devices may work together, either independently of people or with human input and with this security breaches and hacking opportunities are increased.

Accordingly, it is desirable for the manufactured products to include robust access control so that unauthorized parties are unable to gain access to the device or its data. It is also desirable for the manufacturers to have a capability to instruct each device to only listen to or communicate with authorized endpoints (for example, other IoT devices) to reduce risks associated with endpoint spoofing, man-in-the-middle and/or other security violations or attacks prevented. It is also desirable for such devices to provide strong identity management, not only for most IoT devices within a product (which may incorporate multiple devices), but also, from a product as a whole to external, authorized endpoints. Each device or product should preferably be configurable as well as easily updatable only with authorized and signed firmware.

SUMMARY

In some embodiments, the disclosed invention provides a robust access control for controlled devices, such as IoT devices by providing strong identity management for IoT devices and products that include such devices, by using PKI for security and authentication of such devices, products and the data they produce.

In some embodiments, the disclosed invention is a method for authenticating a first and a second electronic devices associated through a communication line. The method includes: creating a unique ID, by a third electronic device; transmitting the unique ID to the first electronic device; signing the transmitted unique ID by the first electronic device; transmitting the signed unique ID to the second electronic device, by the first electronic device; signing the transmitted signed unique ID by the second electronic device; transmitting the unique ID signed by the first and second electronic devices to the third electronic device; verifying and accepting the unique ID signed by the first device and the second device, by the third device; issuing a certificate for a secure communication line between the first electronic device and the second electronic device; and transmitting the certificate to the first electronic device and the second electronic device.

In some embodiments, the disclosed invention is a method for authenticating a first and a second electronic devices associated through a communication line. The method includes: incorporating a public key in a digital certificate of the communication line; confirming identity of the second electronic device, by the first electronic device; requesting to establish a secure communication session with the second electronic device, by the first electronic device; digitally signing an invitation and transmitting the signed invitation to the second electronic device, by the first electronic device; confirming authenticity of the signed invitation utilizing the public key in the digital certificate of the communication line, by the second electronic device; signing the signed invitation and transmitting it to the first electronic device in a response, by the second electronic device; confirming authenticity of the response utilizing the public key in the digital certificate of the communication line, by the first electronic device; and establishing the secure communication session between first electronic device and a second electronic device.

The first electronic device and the second electronic device may be Internet of Things (IoT) devices and may be components of an automobile, an oil pump, a household appliance, an aircraft, a medical device, an electrical grid, a smart city, or a military weapon or system.

BRIEF DESCRIPTION OF THE DRAWINGS

These and other features, aspects, and advantages of the present invention will become better understood with regard to the following description, appended claims, and accompanying drawings.

DETAILED DESCRIPTION

Figure 1:
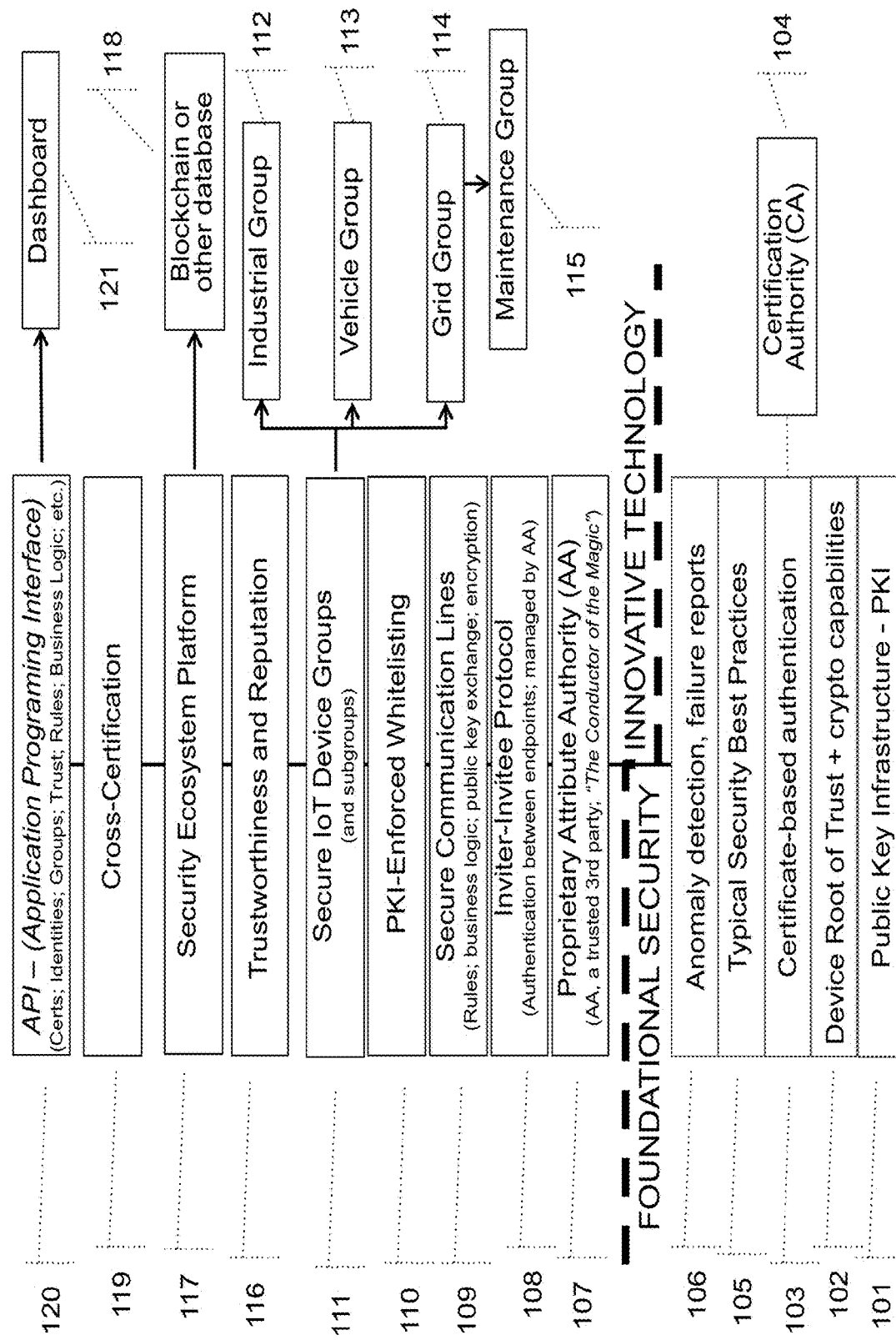
FIG. 1 is an exemplary process flow diagram of a trust stack, according to some embodiments of the disclosed invention.

FIG. 1 is an exemplary block diagram of a trust stack, according to some embodiments of the disclosed invention. Generally, in computing, a solution stack or software stack is a set of software subsystems or components needed to create a complete platform such that no additional software is needed to support applications. Applications typically run on or run on top of the resulting platform. For the purposes of the present disclosure and the security ecosystem described therein, solution stack as shown in FIG. 1, is called a "trust stack". The elements of a security ecosystem, particularly when use cases may involve Internet of Things (IoT) devices, may generally be divided into two broad categories. One category may be referred to as "foundational security." This trust stack identifies both typical foundational security elements as well as typical non-foundational security ecosystem elements, according to some embodiments of the disclosed invention.

In some embodiments, the security ecosystem described herein utilizes foundational security that may be provided by others and is typically built upon (and leverages) Public Key Infrastructure 101 (PKI). For instance, PKI 101 may be provided through a cloud service, an enterprise, by the security ecosystem itself or other. Roots of trust 102 may be supported in various manners, such as through the injection of private keys (typically during the manufacturing process of a device) or with a physical unclonable function (PUF) root of trust or another method. Typically, a root of trust function includes various cryptographic capabilities needed to support various capabilities of the security ecosystem (for example, digital signing, encryption and others). For root certificate-based authentication 103 used in foundational security, a security ecosystem may use a Certification Authority (CA) 104 within a managed PKI or utilize the services of an external public CA.

Typical Security Best Practices 105 are generally considered to be an element of foundational security for IoT devices. This element may include components such as, secure boot, signed firmware updates, defense-in-depth and others. Another element of foundation security may include functions such, an anomaly detection (such as unexpected activities being evident on a device) and failure (such as a device not performing as expected) reports 106.

Building on the foundational security 101-106, a security ecosystem offers innovative technology 107-121 in order to enhance the capabilities of IoT devices designed to perform desirable capabilities. Many of these innovative technology elements typically depend upon and utilize an Attribute Authority (AA) 107 which may act as a trusted third party to manage and/or establish many of the security ecosystem features and benefits described in levels 108 to 119.

An Inviter-Invitee Protocol 108 processing may be used between a pair of IoT devices (or other endpoints) for creating secure communication lines 109. Throughout the present disclosure, the term "line" in "secure communication line refers to a secure relationship between the relevant devices.

Inviter-Invitee processing typically utilizes elements of Foundational Security and preferably results in secure communication lines, a methodology that reduces man-in-the-middle attacks. Completion of Inviter-Invitee Protocol processing may include acceptance of a digital agreement(s) proffered by the inviter which become a component of a secure communication line 109. Inviter and Invitee Processing may also generate digital audit trails. Digital audit trails of events occurring at or by endpoints (for example, on a configurable basis) enhance data integrity through a security ecosystem's optional ability to provide authentication, reputation metrics, end-to-end audit trails and/or other benefits (which may also support trusted transaction records). One result of this standards-based system, enables non-repudiation of endpoint events and data to be adjudicated, generally trustworthy by external parties.

Secure communication lines 109 between IoT devices may include one or more of exchanging public keys, digital signing, encryption of digital assets, installing operating rules, business logic, device operating code and/or structure into the operation of devices as well as the relationship between those IoT devices (more simple rules may be useful for limited resource IoT devices to follow with more complex rules being useful for more robustly resourced IoT devices). Complex rules may include firmware or software code that provides actions for a device to follow and/or incorporate the actions into its operations. For example, a rule may instruct a device to accept additional rules and/or instructions from (and digitally signed by) a trusted source, e.g., an endpoint identified by its public key, digital identity token, certificate or other entities.

In some embodiments, through the use of secure communication lines with their described capabilities, through rules, business logic, code typically in the form of a binary file (or other record), etc., and/or possibly through the use of secure IoT device groups (described herein) and/or subgroup technology, a device may come to trust what other devices it may or should talk to. By controlling or directing IoT device behavior using such techniques, such procedures are expected to typically assist devices to help keep themselves and/or their data secure.

In some embodiments, secure communication lines 109 and associated rules enable devices to talk only to previously authenticated devices and no other devices or endpoints, referred to as PKI-Enforced Whitelisting 110. Rules, business logic, device code, etc. are delivered to IoT devices via incorporation into a PKI or attribute certificate, accompanied by a PKI or attribute certificate, digitally signed binary file, or other means. PKI-Enforced Whitelisting 110 may be established for supported device(s) under which device(s) follow rules and talk only as directed to previously authenticated devices and no other devices and thus supporting enhanced device security, anti-spoofing, and/or anti-hacking.

The security ecosystem may further include secure IoT device groups and subgroups 111. Groups may be created by associating previously authenticated devices and/or other endpoints into groups and memorializing the creation of a group through the issuance of an attribute certificate arranged through the actions of an attribute authority in conjunction with a PKI and/or a Privilege Management Infrastructure (PMI). In some embodiments, groups and subgroups of groups and/or other subgroups may be utilized for various purposes, for example, a single production line in a manufacturing plant 112; the devices in a manufactured product (e.g., vehicle 113, medical equipment, machine, etc.); or grouped devices (e.g., by type, features, location, etc.) within an electrical grid group 114; street lights and/or traffic lights in a geographic area(s).

In some embodiments, a maintenance group 115, composed of one or more endpoints (typically a computer, tablet or other smart devices), each operated by qualified for instance maintenance personnel, is created in order to provide authorized maintenance to one or more IoT (or other) devices or group(s) of devices to be maintained (e.g. a vehicle 113, production line 112, electrical grid 114 or other). In some embodiments, device(s) and/or other endpoint(s) that are members of a group to be maintained (for example, in an automobile) may be pre-provisioned by an attribute authority with a trusted attribute (or other) certificate for such a trusted maintenance group that preferably would identify to such automobile IoT (or other) device a maintenance group endpoint seeking access to it could be authenticated as a member of a trusted maintenance group that such an vehicle device(s) to be maintained, should trust. When such a managed device is contacted later by an external endpoint claiming to be a maintenance group member, the device is able to authenticate (for example directly with an attribute authority of a security ecosystem, relying on stored certificates, or other method) that such an external device is a valid, trusted member of a maintenance group (thus preferably enhancing device security, maintenance reliability, maintenance access, and other benefits).

By gaining trust through the authentication of an endpoint as a member of such a group-to-be-trusted, an IoT (or other) device to be accessed by the group-to-be-trusted is able to trust such a group-to-be-trusted endpoint that can authenticate (typically via an attribute authority or certificate or other method) as being a member of such a group-to-be-trusted (e.g., a maintenance group). Such an arrangement helps support the establishment of trusted maintenance of, security of, control over and/or other legitimate need, for products incorporating IoT devices that are produced by users of a security ecosystem. Trustworthiness and Reputation 116 of both endpoints/devices and their data may be tracked within a security ecosystem and scored as well.

A security ecosystem platform 117, may record designated and other events, records, certificates, etc., immutably on a blockchain or other databases. Recording the records on a block chain provides the advantage of decentralization of the data storage and control. For example, by storing data across its peer-to-peer network, the blockchain eliminates a number of risks that come with data being held centrally. The decentralized blockchain may use ad-hoc message passing and distributed networking. In some embodiments, the blockchain may be a Permissioned blockchain. Permissioned blockchains use an access control layer to govern who has access to the network. Moreover, the PKI of one security ecosystem may practice cross-certification 118 of certificates, identities, and/or other attributes with the PKI of another security ecosystem.

As shown in block 120, an Application Programming Interface (API) typically interfaces with a dashboard (user interface) 121. In some embodiments, the dashboard 121 includes controls and visualizations used by a user to interface with the security ecosystem platform 117. The API 120 also typically interfaces with the AA 107 regarding identities, groups, trusts rules, business logic and more.

Typically, elements of the trust stack of FIG. 1 are utilized so that provisioned devices benefit from (and provide benefits of) the security ecosystem to a user, customer, enterprise, government or others. When putting a device into service, a device must first be provisioned and typically registered. An initial step of being put into services would be a successful application of the Inviter-Invitee protocol, which typically results in an establishment of an authenticated relationship with another devices thus creating a secure communication line. With such devices following rules that may be provided to them during the Inviter-Invitee protocol, improved operational security of such devices is achieved in a form such as PKI-Enforced Whitelisting. A provisioned device or provisioned endpoint typically includes a device with firmware to support the features of the security ecosystem, a device or endpoint identity, a unique ID, a root of trust, a public key, a device digital certificate and other capabilities as described.

A manufacturer (and/or service provider) may manufacture and/or sell a device incorporating such capabilities of the security ecosystem directly (or possibly through distributors) to end customers to enable such customer to collect data from IoT devices, Programmable Logic Controllers (PLC's) and/or other devices with the delivery of such data preferably being done in a secure manner. One result may be that a collection of strategically installed control devices could support the preferably secure delivery of data to a secure cloud platform (or other network facilities) where it may be used for analysis and action, such as in IoT data analytics (in one embodiment as a result of preferably machine learning and in another embodiment as a result of artificial intelligence).

Such analysis generate recommended, suggested or other actions, reports and/or other useful actions and may be made available to a customer or user's own cloud computing/ storage or other computers for its purposes. Such analysis may also be securely delivered using the described trust control devices from a cloud or IT network to IoT devices or PLC's in order to preferably provide instructions to direct and/or enhance their operational performance. In some embodiments, a control device at the IoT device-PLC end is provisioned to support one-way communications to such devices, for example, by using one-way diodes. One-way communications could preferably enhance security and hamper a possible attack. When employing such embodiments, it may be desirable to have a second or separate pair of control devices (e.g., without the one-way communications limitations) that didn't reach as far as to systems supporting the previously described analysis and action capabilities in order to support more common reporting and management activities (for example as within a SCADA system).

Such Security Ecosystem system-supported secured, authenticated remote control devices preferably provide to enterprise customers (that have remote IoT devices, PLC's, etc. which generate data) the benefit of typically efficient, secure and reliable solution to retrieve and manage those data.

Figure 2:
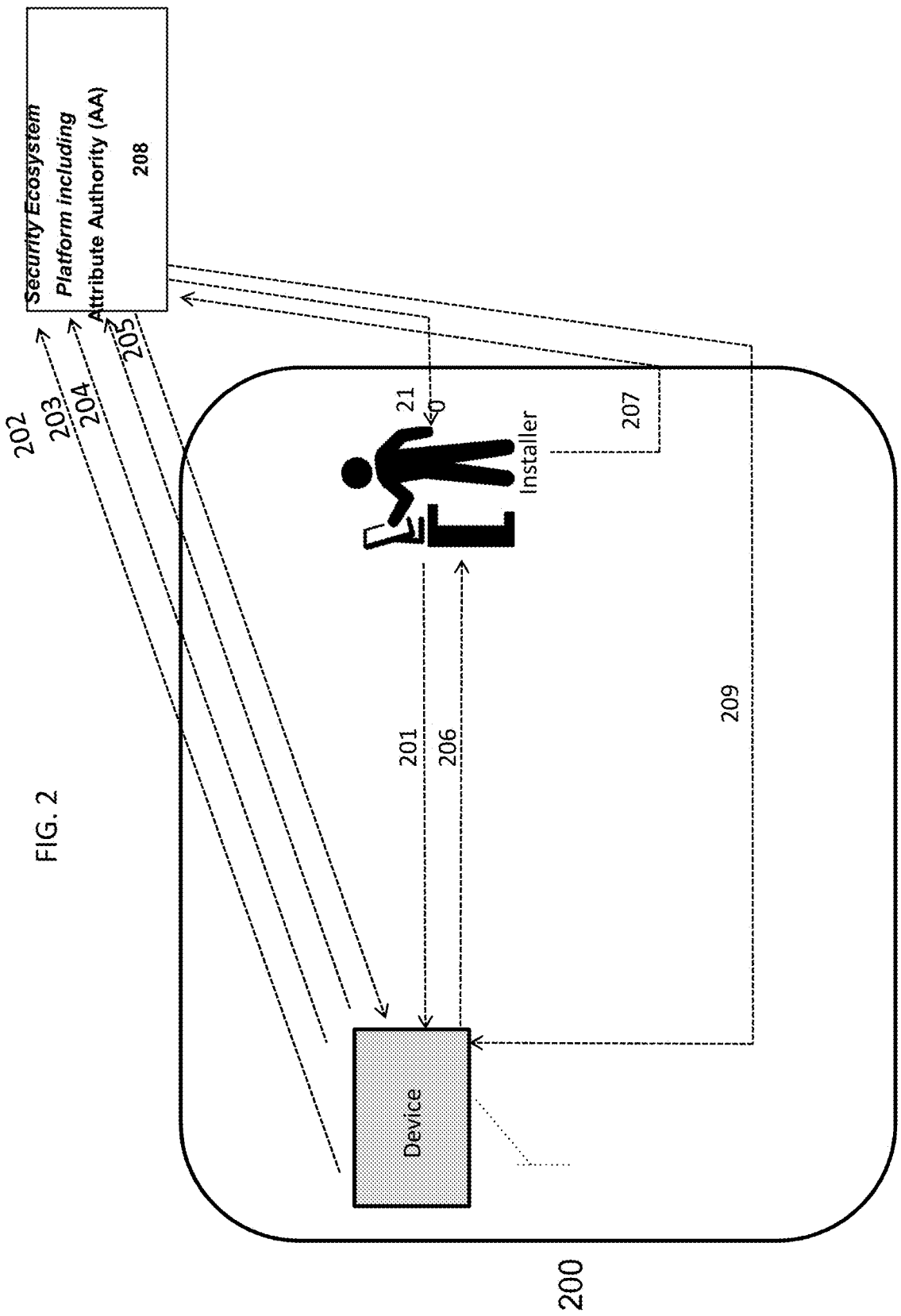
FIG. 2 is an exemplary process flow diagram for provisioning a device, according to some embodiments of the disclosed invention.

FIG. 2 is an exemplary process flow diagram for provisioning a device, according to some embodiments of the disclosed invention. Devices may be provisioned prior to their sale through distributors or others or directly. Provisioning typically provides for device authentication, which may be maintained and relied upon through a sales, registration, installation and/or operational process.

An installer may load a trust control device (TCD) or other device 200 with firmware typically including a software with an IP address of typically an Attribute Authority (AA) application on a security ecosystem platform 208. An identity is typically provided to a device (e.g., trust control device, etc.), as depicted by data communication 201 (e.g., generally from an installer). The device 200 then connects to a security ecosystem platform 208 that includes an AA and a Globally Unique Identifier (GUID) is assigned to the device, and then the device is registered. An unique root of trust ID (for example a generated PUF ID) is typically provided by a device (if not previously provided) as shown by 203 and is associated with the GUID by the AA. Subsequently, a unique root of trust ID (for example a generated PUF ID, typically a public key) is provided by device (if not previously provided) as depicted by 204 and is preferably associated with the GUID by the AA. A device certificate is then issued that typically includes GUID, device ID, and/or device public key and sent to the device 200, at 205. A Digital Identity Token (DIT) asserting the device's unique identity (e.g., a specific trust control device) which includes device's specs, claimed identity/role within a network and/or other installer provided information and its public key(s) is digitally signed by the device and provided at 206 to an installer or other designated endpoint.

At 207, DIT of the device 200, which is typically sent to Installer with Installer's (possibly non digital) certification is then sent to AA at the ecosystem platform 208 (installer preferably has an app and it digitally signs the DIT), where the authentication of the device is processed with the DIT, and the device identity is verified and typically accepted by the AA. In some embodiments, the device is registered with a newly created attribute certificate provided via the AA.

The AA securely sends device attribute certificate together with public key certificates and/or attribute certificates of other devices and/or groups that the device should trust (e.g., a firmware signing authority; a maintenance group; and possibly others) to the device 200, as shown by 209. Device 200 may digitally sign such certificates as received to ensure their future trustworthiness. A copy of device's certificate is then sent to Installer 210.

Figure 3:
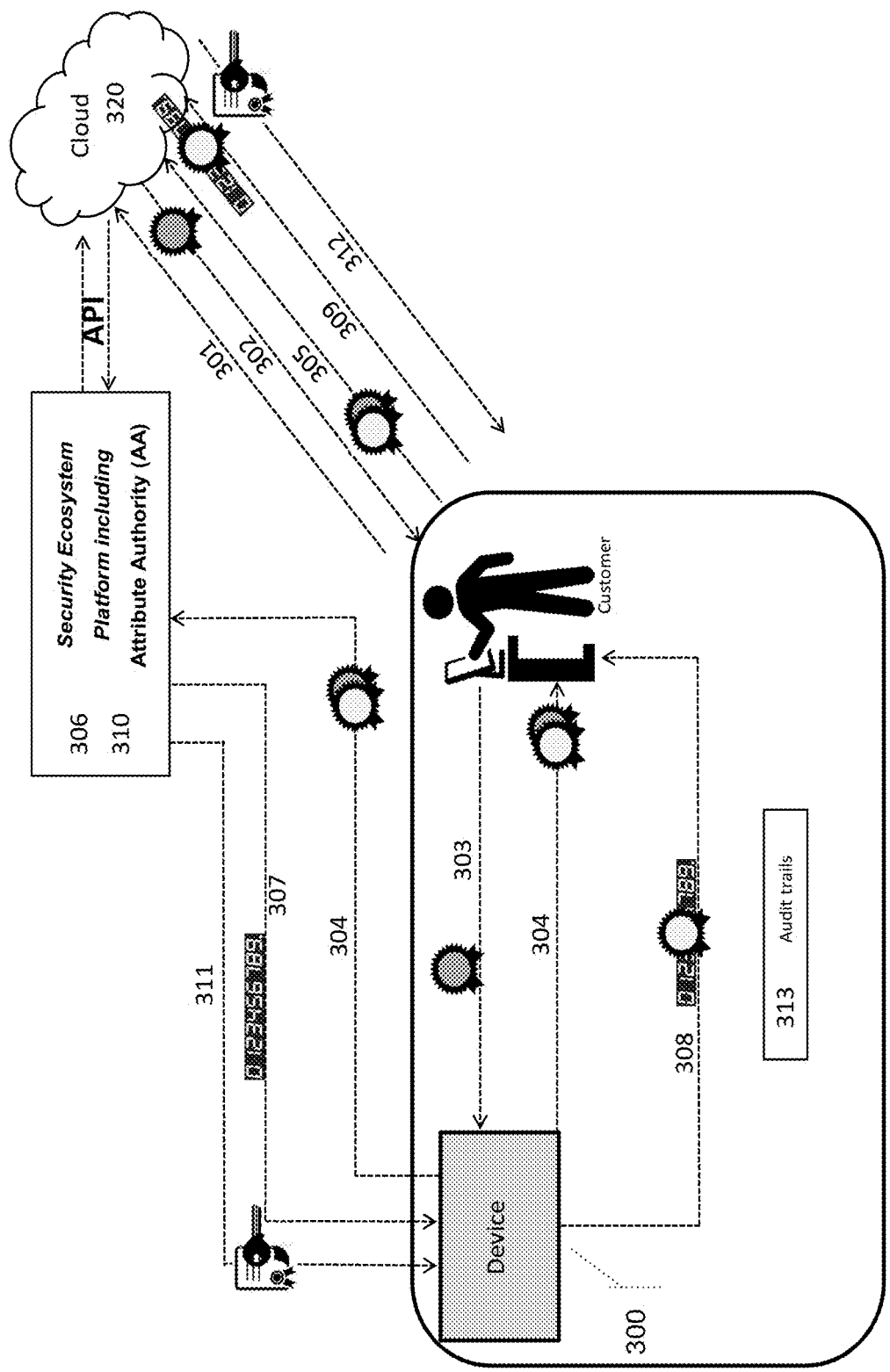
FIG. 3 is an exemplary process flow diagram for customer registration of a device, according to some embodiments of the disclosed invention.

FIG. 3 is an exemplary process flow diagram for customer registration of a device, such as a TCD or termination endpoint device, according to some embodiments of the disclosed invention. Typically, uniquely identified devices may become registered and associated with specific customers or other end users. Authorized, typical optional features may be selected and subscribed by a customer (or other end user) and subsequently be activated by a service provider for accurate monitoring of support devices and/or their services.

In some embodiments, using a browser connection, a customer registers a device 300 via a service provider browser portal to a cloud 320, as shown by 301. The browser portal may include customer selected, device specific options, such as: provider licensing service options selection matrix; groups and sub-groups for possible device-specific assignment; selection of rules, business logic that may be added to secure communication lines and/or attribute certificates; and more. The web portal provides the customer with device-specific setup token to the customer at 302. Using a second local browser window, customer connects to device 300 and uploads setup token to the device at 303. Device 300 then validates the setup token and replies with an acceptance token (or other acceptance indication) signed with its private key at 304.

Customer then sends device's signed acceptance token to an AA at the cloud 320 (the installer typically has app installed and digitally signs token) at 305. The AA then verifies signed token acceptance at 306. Also, out-of-band confirmation is performed with the AA sending a one-time-only unique ID (typically a nonce) to device at 307. Device 300 then signs an unique ID and provides the signed unique ID (e.g., encrypted) to customer for uploading to AA at 308. At 309, customer attests (optionally digitally) to device acceptance and uploads the signed unique ID to the AA. At 310 the AA reviews, verifies, and typically accepts the token, and issues an attribute (or other) certificate confirming device registration. At 311, the AA sends the device attribute certificate (incorporating device public key) to the device 300 and to customer via the web portal. The registration may also generate audit trails 313, based, in part, on digital signatures. In some embodiments, the customer function could be performed in a comparable manner by an artificial intelligence managed endpoint. A "customer" is one example of an installer. Other examples include "other end user", an "artificial intelligence managed endpoint", and other similar types of end points.

Figure 4:
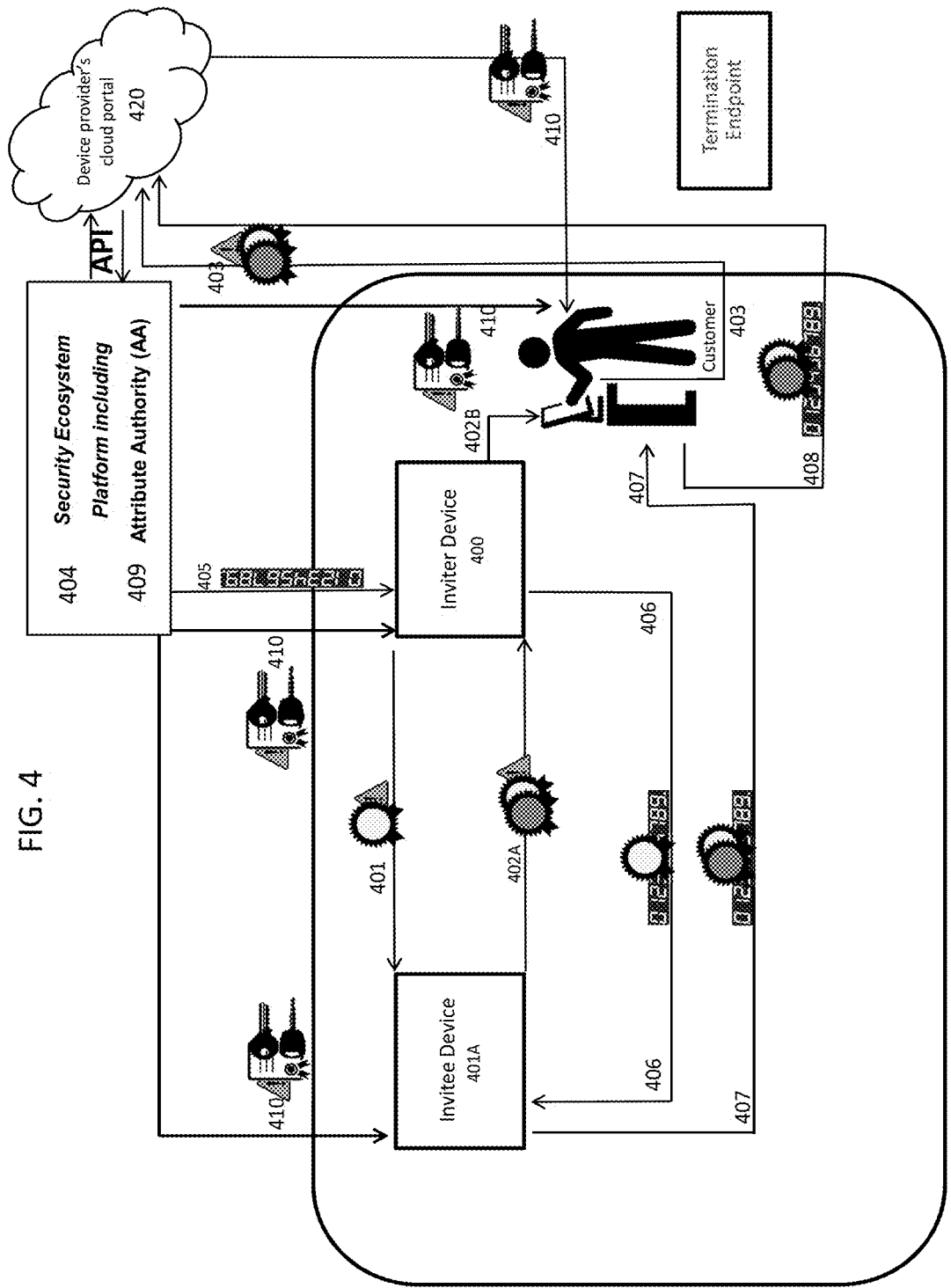
FIG. 4 is an exemplary process flow diagram for establishing a secure communication line between two endpoints, according to some embodiments of the disclosed invention.

FIG. 4 is an exemplary process flow diagram for establishing a secure communication line between two endpoints, according to some embodiments of the disclosed invention. The endpoints may be a trust control device (generally described with respect to FIG. 5) or an endpoint termination device (which is typically a less featured trust control device, for example, with less significant data collection capabilities, fewer ports, etc.), or another capable, provisioned device. In some embodiments, secure, authenticated, persistent communication lines may be established between each device and a cloud portal 420 (or with another device and or provisioned endpoint).

The protocol described includes innovative uses of unique IDs (also known as nonces). Signed nonces are cryptographic primitives used in protocols to avoid replay attacks from old protocols, like SSH (RFC 4252) to more recent protocols, like TLS 1.3 (RFC 8446). Some use of nonces in some embodiments are explicitly part of a data structure to-be-signed and follows the construction laid down with TLS 1.0 (RFC 2246) and SSH. However, some embodiments embed use of nonces into the long-lived, per-pairing, secure communication line certificates, which happens before the establishment of later secure communication sessions as described in FIG. 6. The normal state-of-the-use of nonces is in the establishment of secure communication sessions, not in the pre-pairing of communication lines.

Inviter device 400 invites 401 (typically at customer direction) an invitee device 401A by sending its digital identity token (DIT) with signed request and optionally a proffered digital agreement to invitee device 401A to establish a communication line. Invitee device 401A typically accepts request and replies 402A, sending its DIT with agreement acceptance to invitee device 400. Inviter device 400 sends (402B) both DITs with invitee device's acceptance 402A (optionally, including an agreement) to customer (or other coordinating/supervising entity or authorized endpoint). Customer typically examines DITs, then optionally provides its certification of devices' agreement and sends DITs 403 to a cloud or network portal 420 and an AA 409 of a security ecosystem platform 404. Prior to sending 403, customer may configure or otherwise provide rules, business logic, etc. for the communication line between the two devices. The AA 404 runs a verification check on what it receives and then may accept the request for processing.

In some embodiments, for out-of-band confirmation, a third-party (device), for example, the AA sends a one-time-only unique ID (e.g., a nonce) to inviter device 400 shown by 405. Inviter device 400 then sends the unique ID 405 that it first digitally signs to the invitee device, shown by 406. Invitee device 401A typically accepts and digitally signs the previously signed unique ID and sends it (at 407) to the customer (or directly to the AA). Customer receives and examines IDs signed by both and then certifies completion of the protocol and uploads them a cloud or network portal 420 and to AA 408. AA typically reviews, verifies, accepts the request and issues an attribute (or other) certificate for the communication line with typically its associated agreement(s), rules, etc., at 409. AA sends such certificate for the communication line between the two devices to each device and customer at 410, confirming to the devices that a persistent, communication line (preferably including digital agreement and public key of each device) has been established between them. Such an example of inviter and invitee processing may generate audit trails based, in part, on digital signatures. Inviter device 400 typically proffers digital agreement(s), rules, business logic to Invitee device. Alternatively, the agreement may be mutually created or assigned by AA, customer, or other authorized entity.

In some embodiments, the customer may be removed, for example, 402A process may become 402 and 402B process may become a replacement of 403 process, where inviter device sends both DITs and acceptance of agreement to the AA. Also 407 process may change so that invitee device accepts and digitally signs the unique ID and sends it to AA. In some embodiments, the customer function is performed in a comparable manner by an artificial intelligence managed endpoint.

Figure 5:
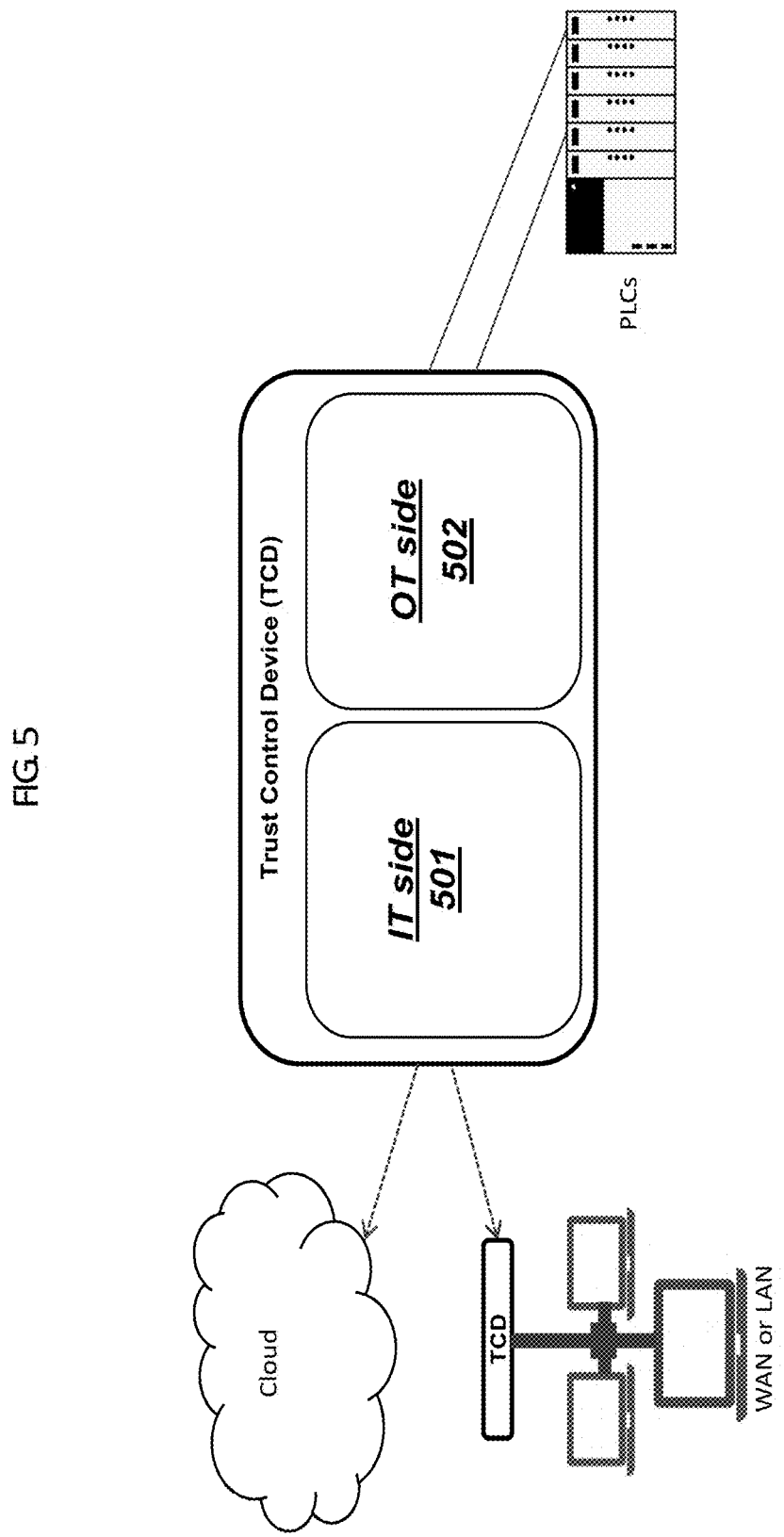
FIG. 5 is an exemplary block diagram of a provisioned device, such as a trust control device, according to some embodiments of the disclosed invention.

FIG. 5 is an exemplary block diagram of a provisioned device, such as a trust control device, according to some embodiments of the disclosed invention. A trust control device (TCD) is a computing device secured with typical foundational security elements plus security ecosystem support capabilities, such that it is able to support the establishment and use of secure communication lines with another security ecosystem supported device (such as another TCD). Optionally, the TCD has collection and storage capabilities as well as other capabilities as described in FIGS. 7-10.

In the previously described FIGS. 2-4, when describing most connections of a trust control device, they typically are associated with the activities of a trust control device's Information Technology (IT) side 501, as such connections are generally server-type computing devices or other trust control-type devices. In some embodiments, the side or port(s) of the trust control device servicing PLC's (Programmable Logic Controllers) or other legacy-security control component of an operational device or system, may be generally considered to be its Operating Technology (OT) side 502, as generally OT-type devices such as PLC's will connect. A TCD may or may not restrict communications to designated device IP addresses to one or more designated communications protocols (e.g., protocols used by a connected PLC). The OT side typically connects to remote PLCs and other devices. In some embodiments, this side may also duplicate capabilities of the IT side so that a second TCD may be connected to a first TCD.

In some embodiments, rules for PLC access may be digitally signed by a trusted entity (e.g. a designated trust control device, firmware signing authority, other) and/or may be incorporated into rules associated with a trust control device's communication line with another authenticated endpoint, and may be provided under a separate AA-provided trusted rules certificate.

On the IT side 501 ports are typically Ethernet ports. On the OT side 502 ports are typically USB, serial, or other types. Rules of allowable PLC communication protocols are typically established on a per-port basis. PLC's (or comparable devices) typically connect to field devices of many types, including: robots, meters, valves, pumps, motors, cameras, military weapons systems, electrical grid, specific components of larger systems such as, a steering control of a ship, a propulsion system of a motorized vehicle, and the like.

In some embodiments, a trust control device may be used to provide authenticated and secure access to a legacy device that does not support the security features and capabilities of a security ecosystem supported device. Such a legacy device would otherwise be generally susceptible to a variety of security attacks, for example, man-in-the-middle, spoofing and others. By connecting a TCD directly and generally close to the legacy device on its OT side in such a manner that the legacy device's only connection to other devices or other endpoints external to it would be through one or more TCDs, then the legacy device is able to benefit from the security provided by a TCD together with the security ecosystem. In some embodiments, a TCD may be installed within or closely associated with an existing, functioning system incorporating legacy devices in order to introduce authenticated, secure communication line capabilities between such a legacy device and a control system of that device or other.

In some embodiments, a TCD helps protect one or more legacy devices against different attack vectors. For example, a bad actor accessing a remote network connection and then attempting to get into an enterprise or IT network, a bad actor's spoofing or compromising a PLC to get on an enterprise or IT network, can each be preferably mitigated by limiting network access to constrained PCL communication protocols.

Figure 6:
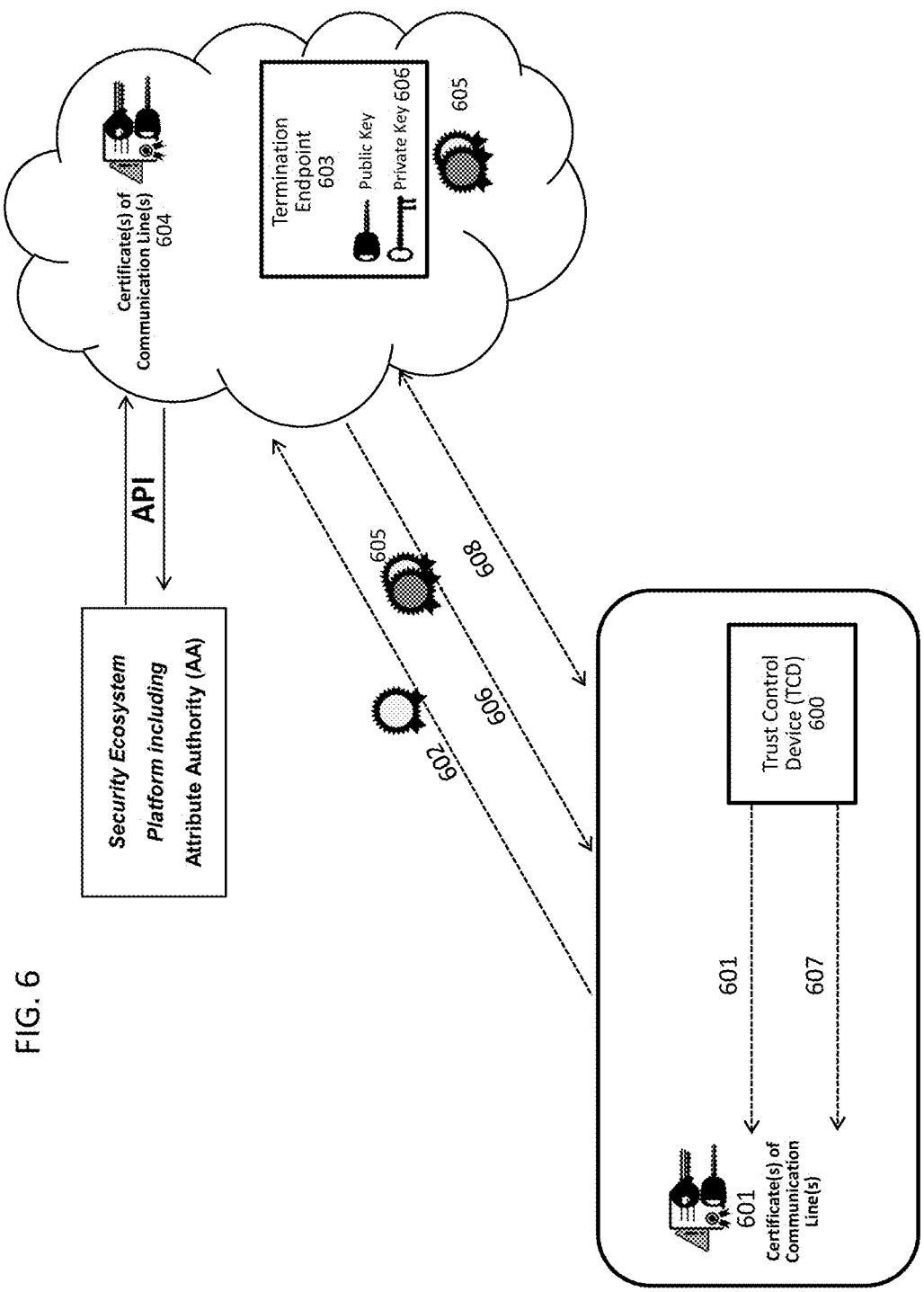
FIG. 6 is an exemplary block diagram of a trust control device for establishing a TLS connection, according to some embodiments of the disclosed invention.

FIG. 6 is an exemplary block diagram of a trust control device or other provisioned device 600 which reports to a cloud (or network platform) 603, according to some embodiments of the disclosed invention when a pre-existing communication line exists between them. Such a communication line has been memorialized with a certificate as described in FIG. 4. As shown in FIG. 4, each endpoint received its own copy of that certificate. For FIG. 6 these copies are shown as 601 and 604. As depicted, a TCD 600 views certificate(s) 601 to determine authenticated endpoint(s) with which it may communicate, optionally, based on some rules. At 602, TCD 600 sends digitally signed request to establish communication to an authenticated termination or other supported endpoint 603. Termination endpoint 603 validates the TCD request 602 request typically using TCD's public key or previously used nonce from the communication line pairing from communication line cert 604, signs acceptance of request using its private key 605 and replies (at 606) with that digitally signed acceptance 605.

TCD 600 validates the acceptance 607 typically using termination endpoint's public key from communication line cert 601.

A Transport Layer Security (TLS) or other secure connection is then established with nonces being used in the conventional way, and data is exchanged between the endpoints at 608. In some embodiments, an API is used for communicating between an endpoint or client application in the cloud and a security ecosystem as well as for reporting and update queries as appropriate, etc. This use of nonces during the establishment of communication lines is different from, for example, SSH which does no trust set up, rather is applies the principle of Trust on First Use (TOFU).

FIG. 6 also generally shows elements through which each of the two devices talk only to previously authenticated devices and no others ("PKI-Enforced Whitelisting"; FIG. 1, 110). A TCD typically originates a communication to a device for which a communication line already exists (thus that device has previously been authenticated), or the broker device may originate a communication to a TCD. A receiving endpoint device uses the communication line certificate it already has to cryptographically authenticate the request for communication from the originating device before responding. The receiving endpoint device then responds in a cryptographically manner that the originating device is able to authenticate.

Upon completion of each of FIGS. 2-4, provisioned devices (e.g., TCDs) may be put into service and report to a cloud (or other) computers.

In some embodiments, device and relationship establishment may be performed according to following process:
1. Provisioning—setup of devices prior to shipping to distributors for retail sale. (See, for example, FIG. 2)
2. Registration—a customer or other end user registers a device, may select a desired licensing or other pricing arrangement, may establish a group or groups for device, may establish rules for device operations, may authenticate device ownership and/or control of a device, etc. (See, for example, FIG. 3)
3. Establishment of an authenticated, persistent secure communication line between a device, another device, a broker or other endpoint in a cloud or data center (typically an endpoint incorporates foundational security, as diagramed in FIG. 1, include a root of trust). In some embodiments, trust control device or other provisioned device may provide a data collection function. (See, for example, FIG. 4)

Upon such steps being completed, a device then becomes operational and may be put in service. Similarly, such embodiments result in one or more of: a typically efficient sales, distribution and/or setup process for devices as generally described herein) being facilitated through a managed, cryptographically-secure process; typically licensed services being activated on a per-device basis in a preferably precise, controlled manner, based on customer request, subscription or other. Such steps result in only authorized, registered devices connecting to designated cloud (or other)

resources and interact for properly authorized service provider-licensed services. Data collected is thus trusted because its provenance is cryptographically established.

Figure 7:
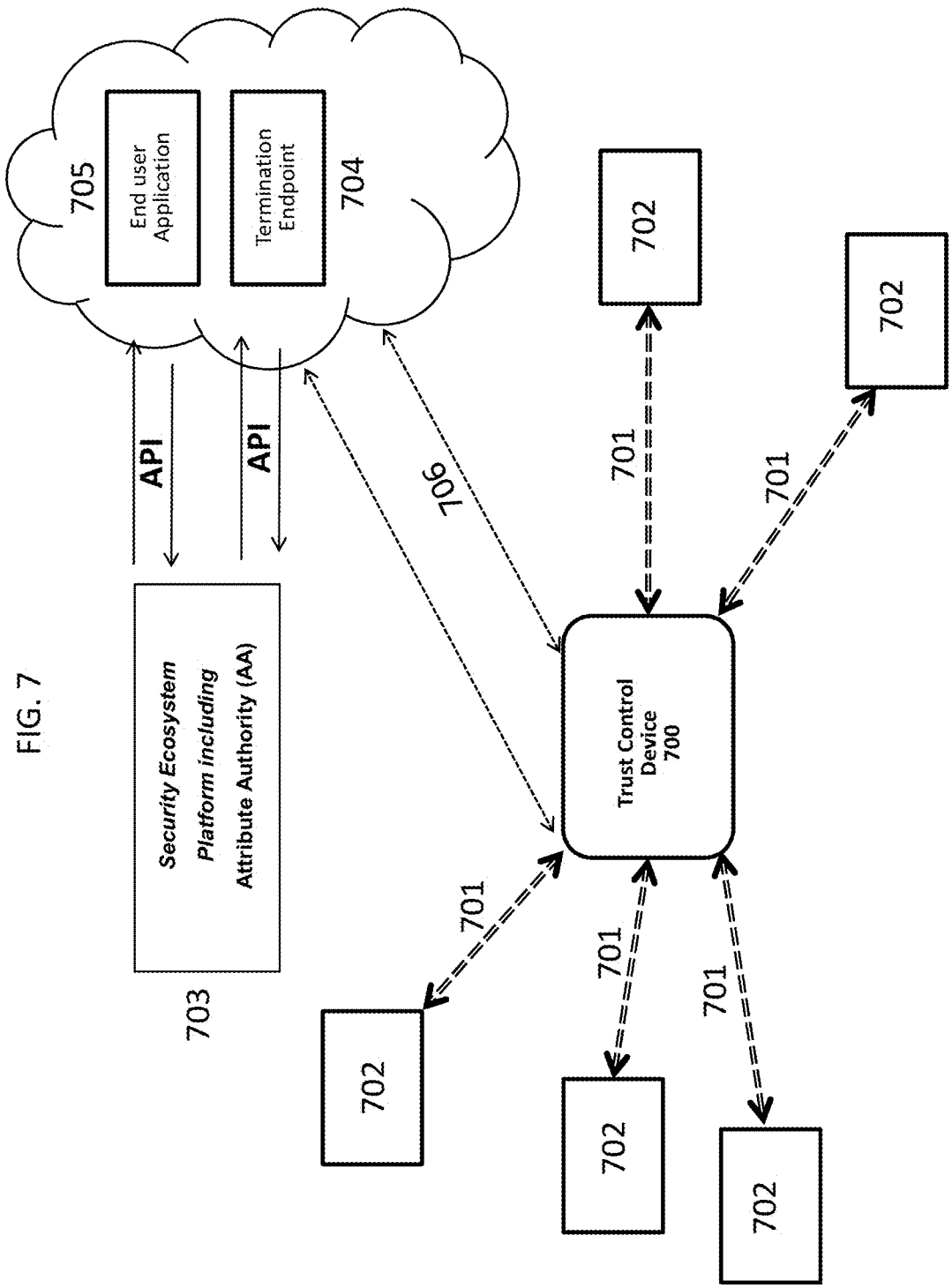
FIG. 7 is an exemplary block diagram of a trust control device acting as a hub, according to some embodiments of the disclosed invention, according to some embodiments of the disclosed invention.

FIG. 7 is an exemplary block diagram of a trust control or other provisioned device acting as a hub with one or more independent autonomous endpoint termination devices, according to some embodiments of the disclosed invention. FIG. 7 shows some embodiments resulting in a customer or end user establishing a secure, authenticated, independently-operating group of field service devices, each of which with typically a secure communication line established with one or more hub/trust control device(s), one or more hub/TCD(s) typically having established a secure communication line with a cloud portal or data center to obtain persistent, authenticated, secure communication between such endpoints.

As shown at 701, a TCD or other provisioned devices 700 establish secure communication lines (as described in FIG. 4) with one or more endpoint termination devices 702. Terminating endpoint in cloud (or in local network) 704 establishes secure communication lines with hub and/or Trust Control or other provisioned device 700. TLS (or other typically secure) connection is established and data is exchanged between the endpoints (as described in FIG. 6). Endpoint termination devices may connect with control, collection or hub devices and are typically provisioned and registered as previously described. Such devices typically establish authenticated communication lines and communicate with each other.

In some embodiments, an API is used for communicating between a trust control device and/or end user application 705 in the cloud and a security ecosystem 703 as well as for reporting and update queries as appropriate, etc. In some embodiments, a service provider may manufacture, market and/or support more than one type of remote IoT devices that may interact with each other.

As shown in FIG. 7, an example may be: independent and/or autonomous field service devices 702 (each of which perform one or more service provider or manufacturer service); or a hub and/or TCD 701 that securely establishes secure communication lines 701 with one or more of such independent and/or autonomous field service devices (using communication line methods similar to those described between a TCD with collection and processing capabilities) and another TCD or termination endpoint (generally a less featured less featured TCD without significant data collection capabilities that typically in a cloud or LAN or WAN termination), as shown in FIG. 6 and interacts with and/or collects data from them (as shown in FIG. 7), and then periodically (or possibly continually) transmits collected data to a secure, authenticated cloud service or data center devices 706 (using methods similar to those described between TCDs and termination endpoints as shown in FIG. 6).

Such embodiments may or may not implement similar provisioning and registration steps as described in FIGS. 2 and 3.

As generally described in FIG. 4, secure communication lines 701 may typically be established between field service device(s) and one or more hub/trust control devices as shown in FIG. 7. Secure communication lines may typically also be established between a hub and/or TCD(s) and a cloud portal or data center (as shown in FIG. 6, if a hub and/or TCD were to be substituted for the TCD in that figure).

In some embodiments, a locking mechanism may be added to a trust control device where different connector cables types for a variety of legacy devices may be connected to connector receptacles of the trust control device under which a locking mechanism in a variety of forms may be closed over the cable, allowing the cable to pass through, but be too small for an end connector to pass through. Preferably not allowing the connector from the TCD to the device to be removed once the locking mechanism is locked. The locking mechanism may be controlled in a variety of methods, such as by key, combination, biometrics, or other.

Improvements for the security and/or operational efficiency of Operational Technology (OT) devices are preferably attainable through the implementation of the security ecosystem technology. OT may achieve improved levels of control and protection of its legacy devices, and in addition OT may also obtain a secure method of delivering IoT analytics data directly to legacy devices in the field for preferably their enhanced operational and financial performance.

As background, IT generally supports connections to the Internet plus related data and technology systems and focuses on the secure flow of data across an organization. OT typically monitors and controls devices and processes of physical operational systems (e.g., assembly lines, utility distribution networks, production facilities, roadway systems, and more). OT systems have generally been kept isolated, not only from the Internet but from other networks as well. Therefore, OT systems have generally not had the duration or quantity of cyberattacks as IT has experienced and has not identified as many attacks nor developed as many mitigations as IT has.

Attack tools are typically getting more and more advanced making attacks easier to carry out. The Internet facilitates the distribution of attack tools, making them more available and obtainable. The challenge for OT is compounded by: (a) many legacy systems and devices typically not having been designed or developed with high level security capabilities; (b) many existing devices typically having security vulnerabilities with a need to be protected; (c) upgrading devices is generally capital intensive; (d) historically, the investment in security upgrades for OT has been much lower than for IT; (e) in OT expected life spans of systems can typically be measured in decades; (f) in OT protection is generally difficult; and (g) in OT the risk of malicious code and attackers is real.

Figure 8:
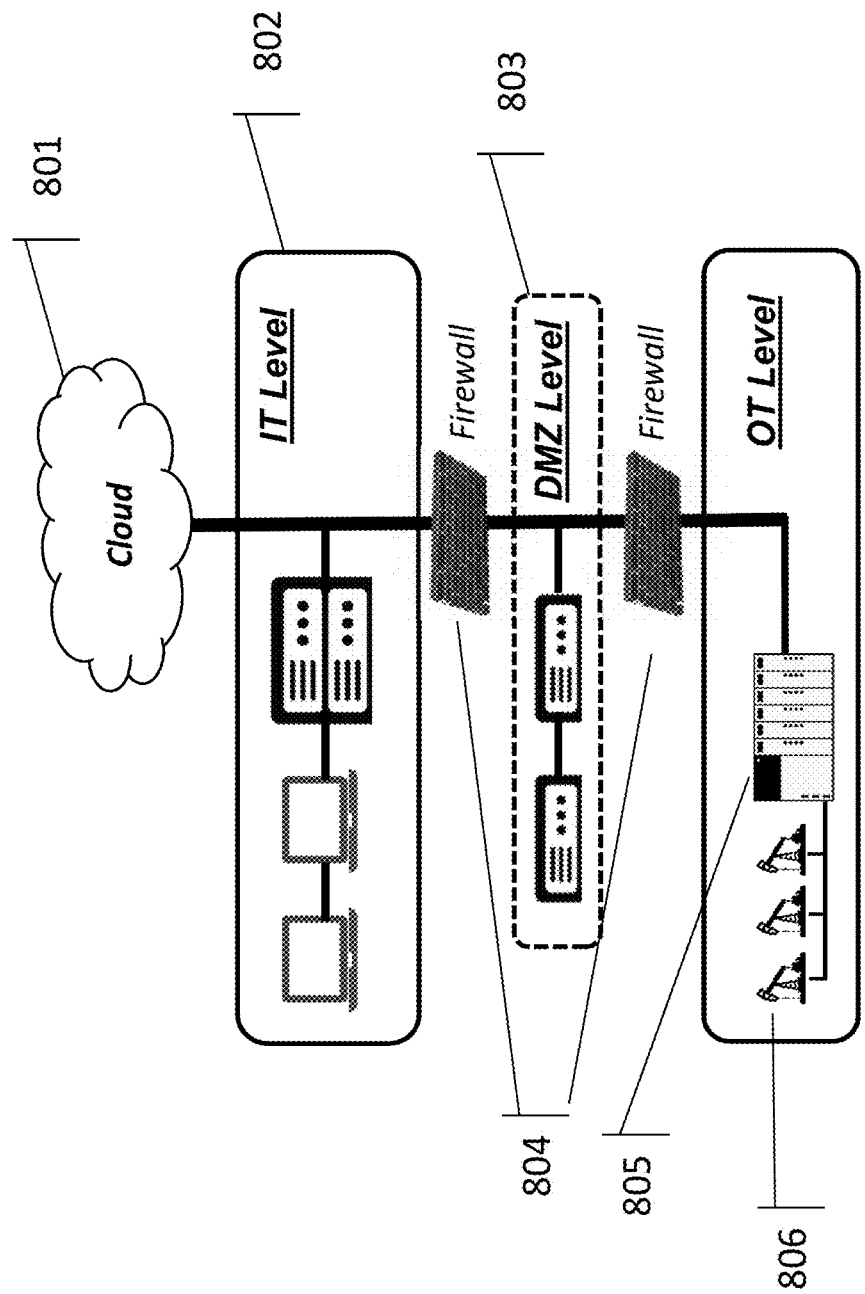
FIG. 8 is an exemplary block diagram illustrating an exemplary application of the Purdue Model providing isolation of an OT level and its separation from an IT level, according to some embodiments of the disclosed invention.

FIG. 8 is an exemplary block diagram illustrating an exemplary application of the Purdue Model providing isolation of an OT level and its separation from an IT level, according a common standard used managing OT and IT interactions today. Widely adopted frameworks generally enforce OT's isolation from IT. The Purdue Model for control hierarchy is generally the most prevalently used in a number of industries. Under this model, IT level 802 (which may include cloud resources 801) and OT level 806 are put in separate zones, isolated by way of a demilitarized zone (DMZ) 803 with each of those zones also being separated by firewalls 804. This typically creates complex walls between systems and complicates an OT network, external access to devices within OT networks such as PLCs 805, and to end field equipment, such as oil pumps 806.

There are significant challenges to be overcome for meaningful improvements to OT security. A PKI solution for OT security should support the authentication, security and trustworthiness of IoT devices, other endpoints as well as their data. A new security and control device, such as a properly designed TCD, according to the disclosed embodiments is helpful to achieve such improvements. Such TCD leverages the trust and security of PKI, and supports strong authentication, security and control. Such TCD is also be integrable into existing OT or IT environments without substantial need for IT support to modify networking configurations.

In some embodiments, a TCD is a hardware component that integrates with a security ecosystem's software components to achieve an overall, desired result. From the software side, the key elements of the solution focus on a trust stack, such as the one depicted and described with respect to FIG. 1. In some embodiments, the trust stack includes:

1. A proprietary Attribute Authority
2. Inviter-Invitee Protocol
3. Secure Communication Lines
4. PKI-Enforced Whitelisting
5. Secure IoT Device Groups
6. API—(Application Programming Interface)

The production of a hardware TCD (with the incorporation of a piece of security ecosystem firmware to run on it) is another part of the solution. Following is a general summary of the capabilities that such technology may provide:

1. A new layer of security to legacy control systems that are operating the machines that generate the enterprise's financial bottom line
2. A new layer of security to machines that have no concept of cybersecurity
3. Tightly defined, authenticated and secure penetrate of the common isolation of OT from IT in order to allow designated legacy (and non-legacy) machines to utilize the real-time power of artificial intelligence and machine learning from cloud computing
4. Reduced exposure to an IT or OT network by malicious attacks that may misuse network connections intended for use by legitimate OT devices
5. Reduced threat of malicious attack by a bad actor who may spoof an unauthenticated legacy device
6. The organization of devices into secure zones that contain related equipment among which data needs to be exchanged
7. Trust Control Devices used as gateways between zones: any data exiting a zone must pass through a Trust Control Device; data must conform to permitted zone device protocols to transit
8. Trust Control Devices only send and receive data with another Trust Control Device (or other supported device) with which it has an existing, authenticated, persistent, secure communication line (no exchange of data with any other endpoint)
9. Reduced possibility of malicious code getting into a zone, a device or network
10. Provide external vendors with remote access only to designated devices for which that vendor is responsible
11. A communication path through a Trust Control Device device may be physically limited to transit in one direction only (where needed for enhanced security)

An efficient sales and distribution process facilitated through a managed, cryptographically-secure process; licensed services typically activated on a per-device basis in a preferably precise, controlled manner; with preferably only authorized, registered devices connecting to cloud resources and interacting for properly licensed services. Data collected is then trusted because its provenance is established through the use of cryptographic tools.

It is widely considered that significant value can be gained from analyzing IoT data and as a result, the field of IoT data analytics has gained prominence and value to IoT operations. In some embodiments in the oil and gas industry, it is widely estimated that a 10-15% operational efficiency may be gained from the use of IoT data analytics, but such are generally being lost due to OT isolation. Isolation can cut OT off from potential benefits from machine learning and/or artificial intelligence.

An OT level including from artificial intelligence (AI) and machine learning provides a tightly defined, authenticated and secure method to penetrate a typical Purdue Model OT-IT isolation barrier in order to securely deliver real-time (or close to real-time) instructions directly to legacy field devices (e.g., oil pumps) so that OT operations can benefit from AI and/or machine learning capabilities (typically from a cloud or IT platform) with a result of improved efficiency, lower costs and higher margins.

Figure 9:
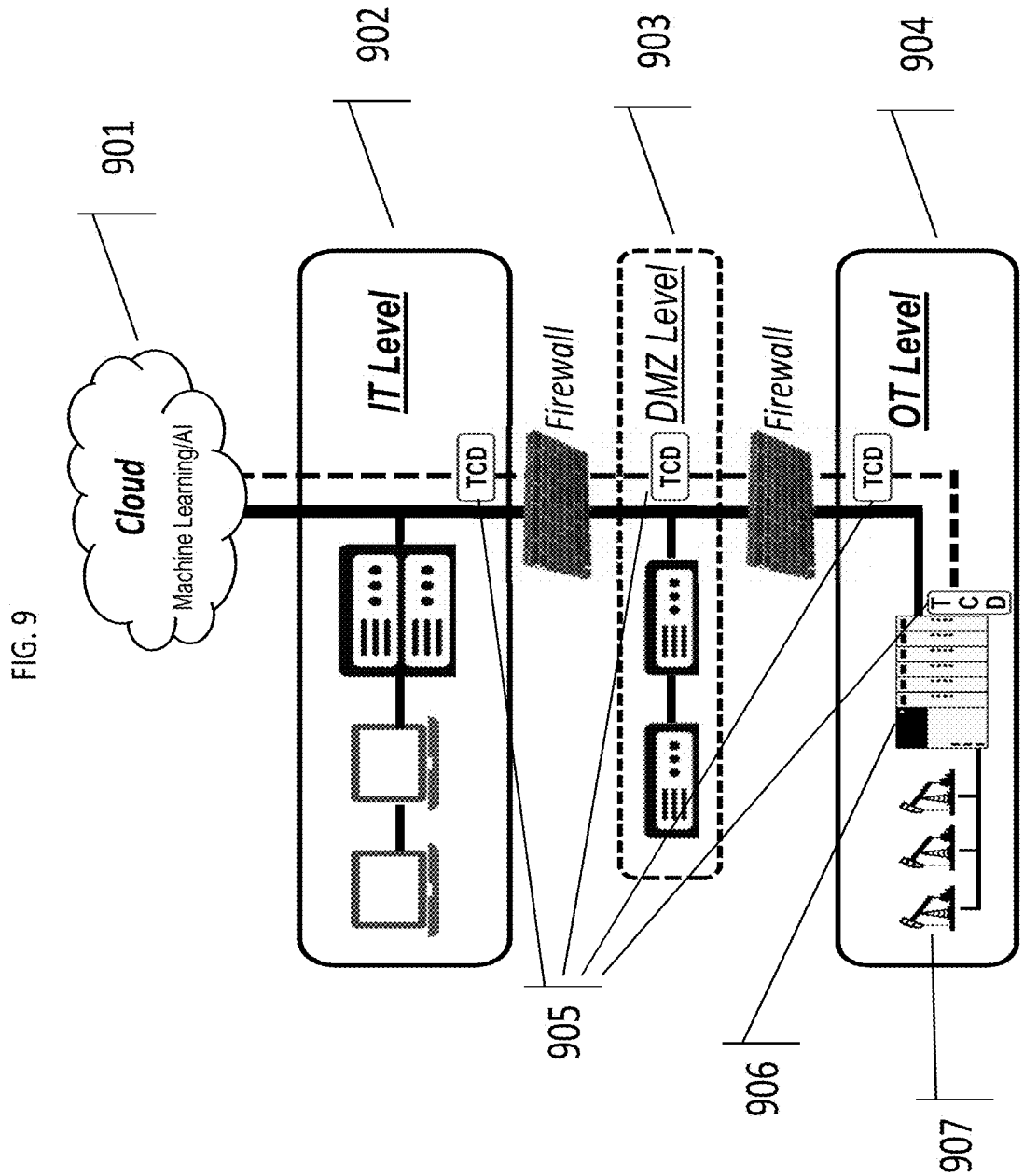
FIG. 9 is an exemplary block diagram showing an exemplary application of the Purdue Model and multiple trust control devices to permit secure transfer of information, according to some embodiments of the disclosed invention.

FIG. 9 is an exemplary block diagram showing an exemplary application of the Purdue Model and multiple trust control devices to permit secure transfer of information, according to some embodiments of the disclosed invention. As shown, using machine learning and/or AI located in a cloud 901, can traverse an IT level 902, a DMZ level 903, cross into an OT level 904 and reach a control unit (such as PLC 906) for end field equipment (such as oil pumps 907), while employing the capabilities of TCDs strategically placed, for example, as shown by multiple instances of 905.

Segregating OT level devices into secure zones provides a capability to organize legacy and other devices within the company's OT environment into zones typically containing related equipment among which data actually needs to be exchanged. Moreover, using TCDs as gateways between zones such that, any data exiting a zone must pass through a TCD, requires that the transmitted data conform to permitted device protocols within a zone. This way, the TCDs exchange data only with another paired TCD (or other authenticated endpoint) such that the two devices have an existing, authenticated, persistent, secure communication line between them.

Figure 10:
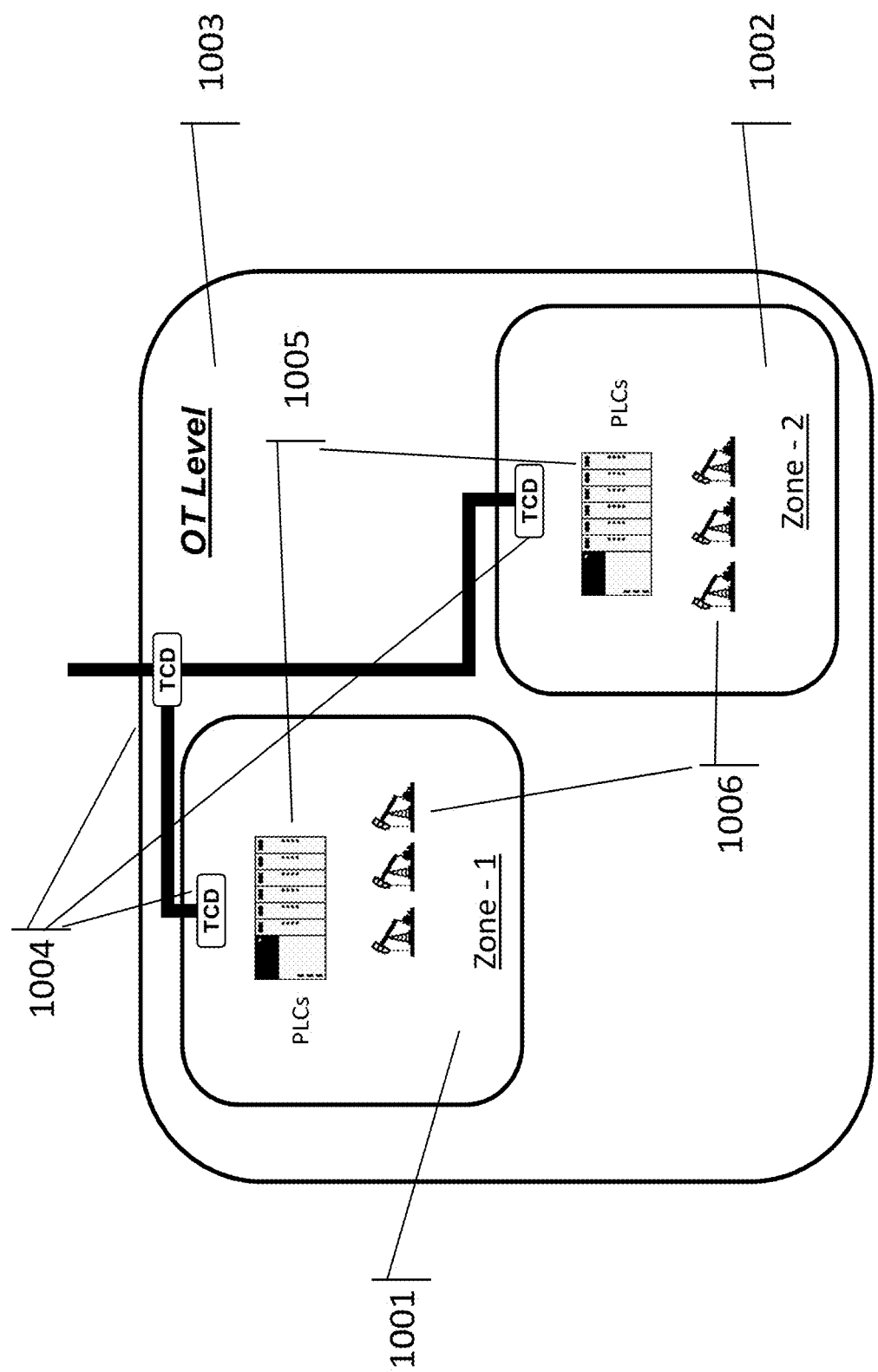
FIG. 10 is an exemplary block diagram depicting an exemplary application of multiple trust control devices within an OT level to create secure zones, according to some embodiments of the disclosed invention.

FIG. 10 is an exemplary block diagram depicting an exemplary application of multiple trust control devices within an OT level to create secure zones, according to some embodiments of the disclosed invention. As shown, an OT level 1003, may become subdivided into zones, for example zone-1 1001 and zone-2 1002 by employing the capabilities of TCDs typically strategically placed, for example, as shown by multiple instances of 1004. This way, communications may protectively and specifically reach desired control units (such as PLCs 1005) for end field equipment (such as oil pumps 1006).

Figure 11:
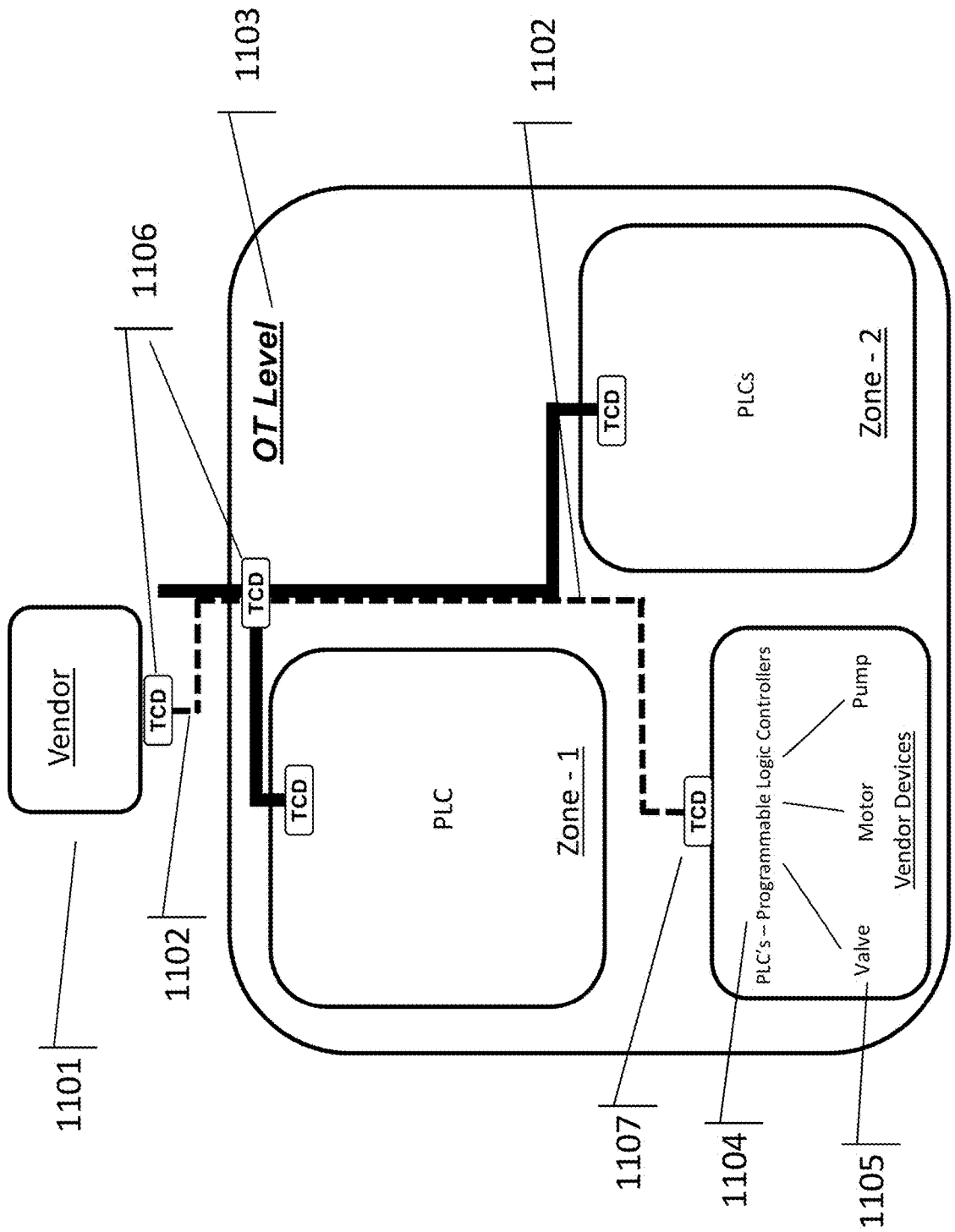
FIG. 11 is an exemplary block diagram illustrating an exemplary application of multiple trust control devices within an OT level to create secure access, according to some embodiments of the disclosed invention.

FIG. 11 is an exemplary block diagram illustrating an exemplary application of multiple trust control devices within an OT level to create secure access on the part of an external vendor (or other authorized entity) to specific vendor (or other authorized) device(s), according to some embodiments of the disclosed invention. As shown, a vendor 1101 access designated devices 1105 and/or PLC's 1104 behind a specified destination TCD 1107 using authorized access through authenticated TCDs 1106 (via a determined network route 1102) within an OT level 1103. This configuration restricts vendors' access to designated (typically vendor-supported) devices with with the support of the security ecosystem technology, including TCDs to those restricted devices, for example, desired control units (such as PLCs 1104) and/or end field equipment 1105. This is achieved with the supported use of TCDs 1106 and 1107 to provide limited, authenticated and secure access specifically to only those legacy devices for which that vendor is responsible.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

The invention claimed is:

1. A method for associated through a communication line a first electronic device and a second electronic device, the method comprising:
- creating a unique identification (ID), by a third electronic device;
- transmitting the unique ID to the first electronic device;
- signing the transmitted unique ID by the first electronic device;
- transmitting the signed unique ID to the second electronic device, by the first electronic device;
- signing the transmitted signed unique ID by the second electronic device;
- transmitting the unique ID signed by the first and second electronic devices to the third electronic device;
- verifying and accepting the unique ID signed by the first electronic device and the second electronic device, by the third electronic device;
- issuing a certificate for a secure communication line between the first electronic device and the second electronic device; and
- transmitting the certificate to the first electronic device and the second electronic device.

2. The method of claim 1, wherein the third electronic device is an Attribute Authority (AA).

3. The method of claim 1, wherein the third electronic device includes an artificial intelligence software for processing of the unique ID and issuing the certificate.

4. The method of claim 1, further comprising inviting the second electronic device by the first electronic device by sending an invitation including a digital identity token (DIT) with a signed request to the second electronic device.

5. The method of claim 4, wherein the invitation further includes a digital agreement.

6. The method of claim 5, wherein the digital agreement includes rules and business logic to provide actions to be taken by the first electronic device or the second electronic device.

7. The method of claim 6, wherein the first electronic device, the second electronic device or the third electronic device is capable of revising the rules and business logic.

8. The method of claim 4, further comprising transmitting a response to said invitation by the second electronic device, wherein said response includes a signature generated by using a private key that corresponds to a public key, with a second Digital Identity Token.

9. The method of claim 8, wherein the public key is within said certificate issued for the secure communication line.

10. The method of claim 1, further comprising grouping the first electronic device, the second electronic device and the plurality of more electronic devices into different groups based on a predetermined criteria, wherein grouping the electronic devices includes group membership and a plurality of associated rules in a respective certificate issued to a respective communication line.

11. The method of claim 1, further comprising preventing other electronic device for which a secure communication line to the first or second electronic device has not been established from communicating with the first or second electronic device.

12. The method of claim 1, wherein the first electronic device and the second electronic device are Internet of Things (IoT) devices.

13. The method of claim 1, wherein the first and second electronic devices are components of an automobile, an oil pump, a household appliance, an aircraft, a medical device, an electrical grid, a smart city, or a military weapon or system.

14. The method of claim 1, wherein the certificate includes rules and business logic for the first electronic device or the second electronic device.

15. The method of claim 14, wherein the rules and business logic are transmitted to the first electronic device or the second electronic device via a binary file or a text file.

* * * * *